United States Patent [19]
Lair et al.

[11] Patent Number: 6,047,626
[45] Date of Patent: *Apr. 11, 2000

[54] VEHICLE ARMOR ANCHORING ASSEMBLY

[76] Inventors: Todd C. Lair; Rick A. Scheer; Steven L. McHugh, all of 1330 E. First, Suite 141, Wichita, Kans. 67214

[ * ] Notice: This patent is subject to a terminal disclaimer.

[21] Appl. No.: 08/948,100

[22] Filed: Oct. 9, 1997

[51] Int. Cl.[7] .............................. F41H 5/04; F41H 5/013
[52] U.S. Cl. ................. 89/36.08; 89/36.02; 296/203.01; 296/39.3
[58] Field of Search ................ 89/36.08, 36.02; 296/203.01, 204, 39.3, 189

[56] References Cited

U.S. PATENT DOCUMENTS

| 4,045,076 | 8/1977 | Day .......................................... 151/41.7 |
| 4,351,558 | 9/1982 | Mueller ................................... 89/36.08 |
| 5,560,672 | 10/1996 | Lim et al. ............................... 296/189 |
| 5,564,744 | 10/1996 | Frost ....................................... 296/189 |
| 5,833,303 | 11/1998 | Kawai et al. ........................... 296/189 |
| 5,868,458 | 2/1999 | Hirata et al. ............................ 296/189 |

Primary Examiner—Stephen M. Johnson
Attorney, Agent, or Firm—Kenneth H. Jack; Davis & Jack, L.L.C.

[57] ABSTRACT

A vehicle armor anchoring assembly for a vehicle having a body frame, and having a passenger compartment, the passenger compartment having a plurality of roof supporting columns, each roof supporting column having an inwardly facing surface and an interior channel, the vehicle armor anchoring assembly including a plurality of interior trim panels, each interior trim panel being fitted for covering the inwardly facing surface of one of the roof supporting columns of the passenger compartment of the vehicle, each interior trim panel having an outer surface and an inner surface, each interior trim panel consisting of a bullet resistant material; and a plurality of cables interconnecting each interior trim panel to the column to which it is fitted, the cables being capable of holding the interior trim panels in place while bullets fired from firearms impinge upon their outer surfaces.

7 Claims, 7 Drawing Sheets

VEHICLE ARMOR ANCHORING ASSEMBLY

FIELD OF THE INVENTION

This invention relates to an anchoring assembly for fixedly attaching interior trim armoring panels to passenger compartments of passenger carrying vehicles, such assembly preventing such armor panels from falling inwardly upon being struck by high velocity projectiles.

BACKGROUND OF THE INVENTION

The upper body frame of a typical passenger carrying vehicle, such as a four door sedan, includes left and right roof supporting "A" pillars, left and right roof supporting center body pillars, and left and right roof supporting rear quarter pillars. Such body frame members may be armored through the application of molded ballistic composite panels to their inwardly facing surfaces. High velocity projectiles which strike the outwardly facing surfaces of such ballistic composite panels tend to drive the panels inwardly away from a position where they may effectively stop successively fired projectiles. Thus, it is desireable to provide an anchoring assembly capable of holding such panels in position during successive impacts of high velocity projectiles. The instant inventive vehicle armor anchoring assembly provides such a capability through the provision of steel anchor cables interconnecting such panels with such body frame members.

PRIOR ART PATENTS

U.S. Pat. No. 4,352,316 issued Oct. 5, 1982, to Medlin discloses a lightweight armored vehicle and method of making the same using woven polyester glass protector sheets.

U.S. Pat. No. 5,413,026 issued May 9, 1995, to Madden, Jr., discloses a removable bullet proof shield for use in vehicles.

U.S. Pat. No. 5,438,908 issued Aug. 8, 1995, to Madden, Jr., describes a removable bullet proof apparatus for vehicles.

U.S. Pat. No. 5,517,894 issued May 21, 1996, to Bohn, et al., discloses an explosion proof mat for use in a vehicle.

U.S. Pat. No. 5,531,500 issued Jul. 2, 1996, to Podvin discloses a bullet proof panel for protecting the door of a passenger vehicle.

None of the above disclosed U.S. Patents teaches, discloses or describes the novel, inventive and unique aspects and features of the present invention.

BRIEF SUMMARY OF THE INVENTION

Interior trim armoring panels of passenger carrying vehicles in general, including automobiles, station wagons, sport utility vehicles, pickup trucks, vans and limousines may be anchored through utilization of the present inventive vehicle anchoring assembly. By way of example, a typical four door sedan is referred to below.

A first step in utilizing the present inventive vehicle armor anchoring assembly in armoring the exemplary four door sedan, is the removal of the following original manufacturer's equipment (OEM) passenger compartment trim panels: The left "A" pillar trim panel, the right "A" pillar trim panel, the left center body pillar trim panel, the right center body pillar trim panel, the left quarter trim panel, and the right quarter trim panel. In modern vehicles such OEM trim panels typically consist of injection molded plastic. Such OEM trim panels are typically held in place by blind fasteners which extend outwardly from an interior (non-finish) surface of the panel, and which are driven into fastener receiving apertures within the vehicle's upper body frame. Such blind fasteners typically are designed so that, upon application of a sufficient manual pulling force to such a trim panel, the panel disengages without damaging the panel or the frame member.

After removal of the "A" pillar, center body pillar, and quarter pillar trim panels, such panels may be either stratified with an armoring layer of ballistic composite material or replaced with a ballistic composite which itself serves as the trim panel. A preferred armoring material utilized in conjunction with the present invention consists of multiple layers of fabric or unidirectional fiber tape, each layer consisting of polyaramid fibers (Kevlar), the multiple layers being impregnated with vinyl ester resin, and the multiple layers being nested between an inner and an outer layer of epoxy resin impregnated fiber glass. Other fibers suitable for fabrication of the ballistic fabric or tape are: extended chain polyethene fiber, ultra high molecular polyethene fiber, nylon fiber, polyaramid fiber, graphite fiber, semi-crystalline polystyrene fiber, semi-crystalline polyethene fiber, structural glass fiber, electrical glass fiber, and "hybrid" combinations of such fibers in various proportions. Other sheet materials in addition to, or as an alternative to the fiberglass layers utilizable as additional ballistic strata are aluminum dioxide ceramic, silicone carbide ceramic, and boron carbide ceramic, such ceramics being formed into sheets between 0.05 and 0.25 inches thick. Other acceptable resins utilizable in fabrication of such ballistic composite materials are phenolic resin, polyester resin, rubber compound resins, silicone resins, and thermoplastic resins. Lamination of the layers of ballistic fabric or strapping and fiber glass into a ballistic composite may be achieved through a suitable molding process such as autoclave molding, vacuum bag molding, heated press molding, or resin transfer molding. The resultant of such molding process applied to such materials is a board-like ballistic composite which, given sufficient layers of ballistic fabric or tape, is substantially impervious to penetration by small high velocity projectiles such as bullets. Utilization of such ballistic composite material as a layer stratifying OEM trim panels is advantageous because blind fastener attachment posts of the OEM panel remain usable for supporting and guiding blind fasteners into their fastener receiving apertures. Where OEM trim panels are not used, blind fastener supporting posts may be adhesively applied to the outward facing surfaces of ballistic composite panels.

Where a ballistic composite panel is utilized as a stratifying layer over the OEM trim panel, such panel is molded so that the inwardly facing surface of the OEM trim panel may nest within the outwardly facing surface of the ballistic composite panel. Prior to adhesively bonding such panels, cable receiving apertures are drilled through the OEM trim panels at positions underlying the blind fastener attachment posts. Steel anchor cables having a steel disc fixedly attached to an end are then extended through the cable receiving apertures so that the discs lie flush against the inwardly facing surfaces of the OEM trim panels. Preferably, the steel cables comprise a multiplicity of interwound steel wires. Upon adhesive bonding of the OEM trim panels to the ballistic composite trim panels, the steel cables are securely and permanently attached. Where OEM trim panels are not utilized, fixed attachment of the steel anchor cables may be accomplished by molding into the ballistic composite the steel discs having the steel cables attached, the steel cables extending outwardly from the molded laminae.

A preferred blind fastener to be utilized for attaching stratified OEM trim panels or ballistic composite trim panels are push in panel fasteners which have an hollow axial channel. Such blind fasteners allow a steel anchoring cable extending through a fastener supporting posts to further extend through the axial channel. Other common blind fasteners which may suitably be used are: catch fasteners, magnetic fasteners, plastic tree clips, removable rivets, push mount rivets, rachet panel rivets, panel clips, serrated plastic fasteners, pop rivets, hook and loop fasteners, push nuts, speed nuts, expanding pins, spring clips, hair pin clips, retaining rings, wedge anchors, split drive anchors, toggle anchors, jack nut anchors, "T" nuts, blind rivets, snap fasteners, snap grommets, and spring fasteners. Where the blind fastener utilized has no hollow axial channel, the steel anchor cable preferably extends along the outer periphery of the blind fastener, and through a fastener receiving aperture within the vehicle's body frame.

From the fastener receiving apertures, the steel anchor cables further extend through hollow structural channels within the vehicle's body frame columns. The distal ends of the steel anchoring cables are preferably looped and fixedly attached to a common anchoring point on a frame member of the vehicle. It is desireable to utilize an anchoring mechanism allowing alternate tensioning and release of the steel cables without cutting the cables. Common threaded eye bolts or hooks are preferably utilized for tightening and releasing of the steel anchor cables.

Accordingly, the object of the present invention is to provide an assembly for anchoring the interior armored trim panels of passenger carrying vehicles by providing steel cables interconnecting molded ballistic composite trim panels and vehicle body frame members armored by such trim panels.

Other objects, benefits, and advantages of the present invention will become known and apparent to those skilled in the art upon review of the detailed description which follows, and upon review of the drawings appended hereto.

DETAILED DESCRIPTION OF THE PREFERRED EMBODIMENT

Figure 1:
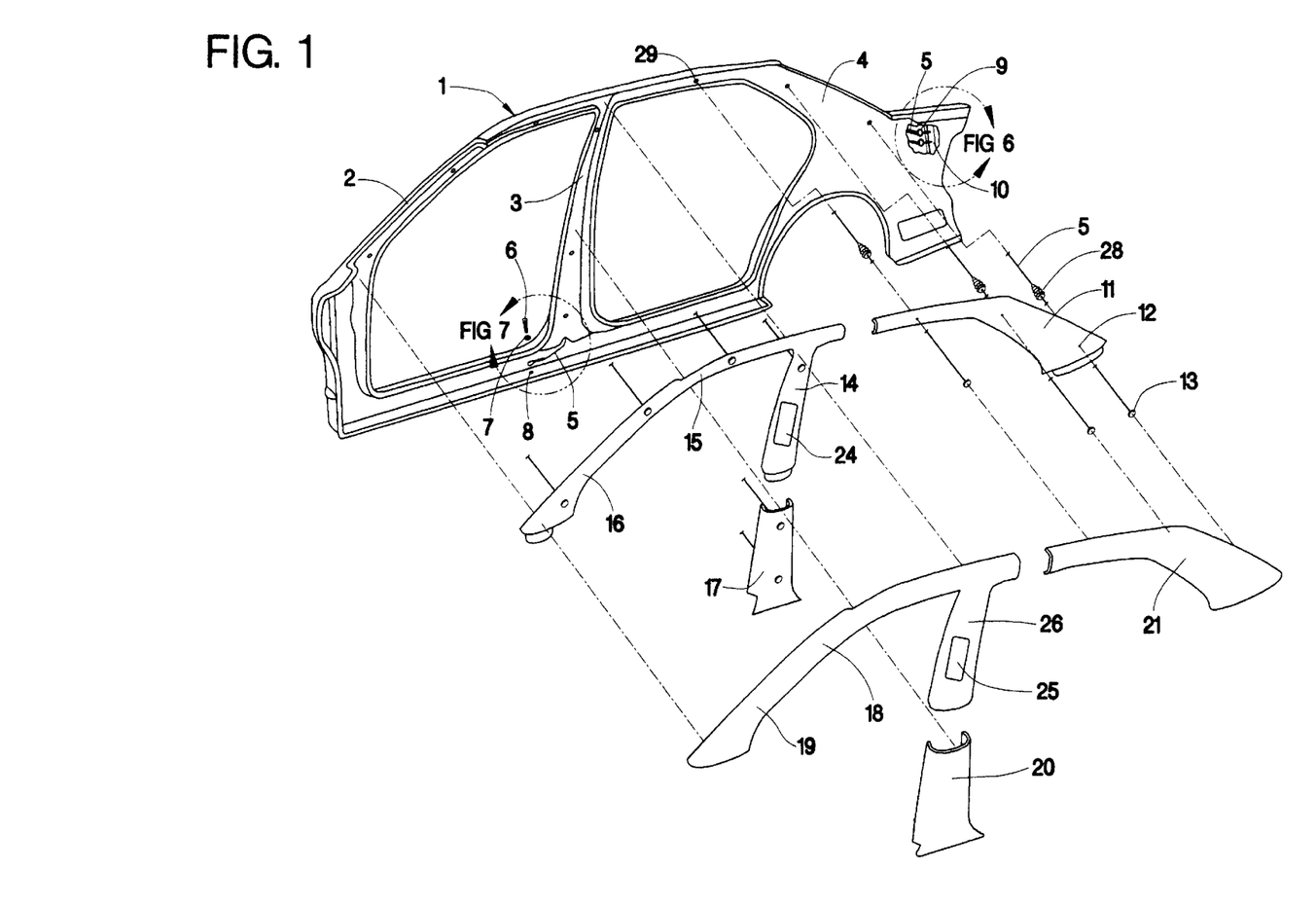
FIG. 1 is an isometric exploded view of right ballistic composite panels, along with a partial view of a passenger vehicle's right upper body frame, the view showing extensions and connections of steel anchor cables.

Referring now to the drawings, and in particular to FIG. 1, an exemplary section of a body frame 1 of a common four door sedan is shown. The body frame section 1 has a right roof supporting "A" pillar 2, a right roof supporting center body pillar 3, and a right roof supporting rear quarter pillar 4. An original manufacturer's equipment (OEM) unitary right "A" pillar and upper center body pillar trim panel 15 having a forward "A" pillar section 16 and having a rearward upper center body pillar section 14 is commonly fixedly attached to the body frame 1 so that the right "A" pillar and the right center body pillar are covered. An OEM right rear quarter trim panel 11 and an OEM right lower center body pillar trim panel 17 are commonly similarly attached, covering respectively the right rear quarter pillar 4 and the lower portion of the center body pillar 3. Typically, the OEM trim panels 15, 11, and 17 are composed of highly durable injection molded plastic. Blind fasteners 28 are a preferred fastening means for interconnecting the OEM trim panels 15, 11, and 17 to the body frame 1, since no portion of such fasteners is exposed on finished surfaces.

Figure 2:
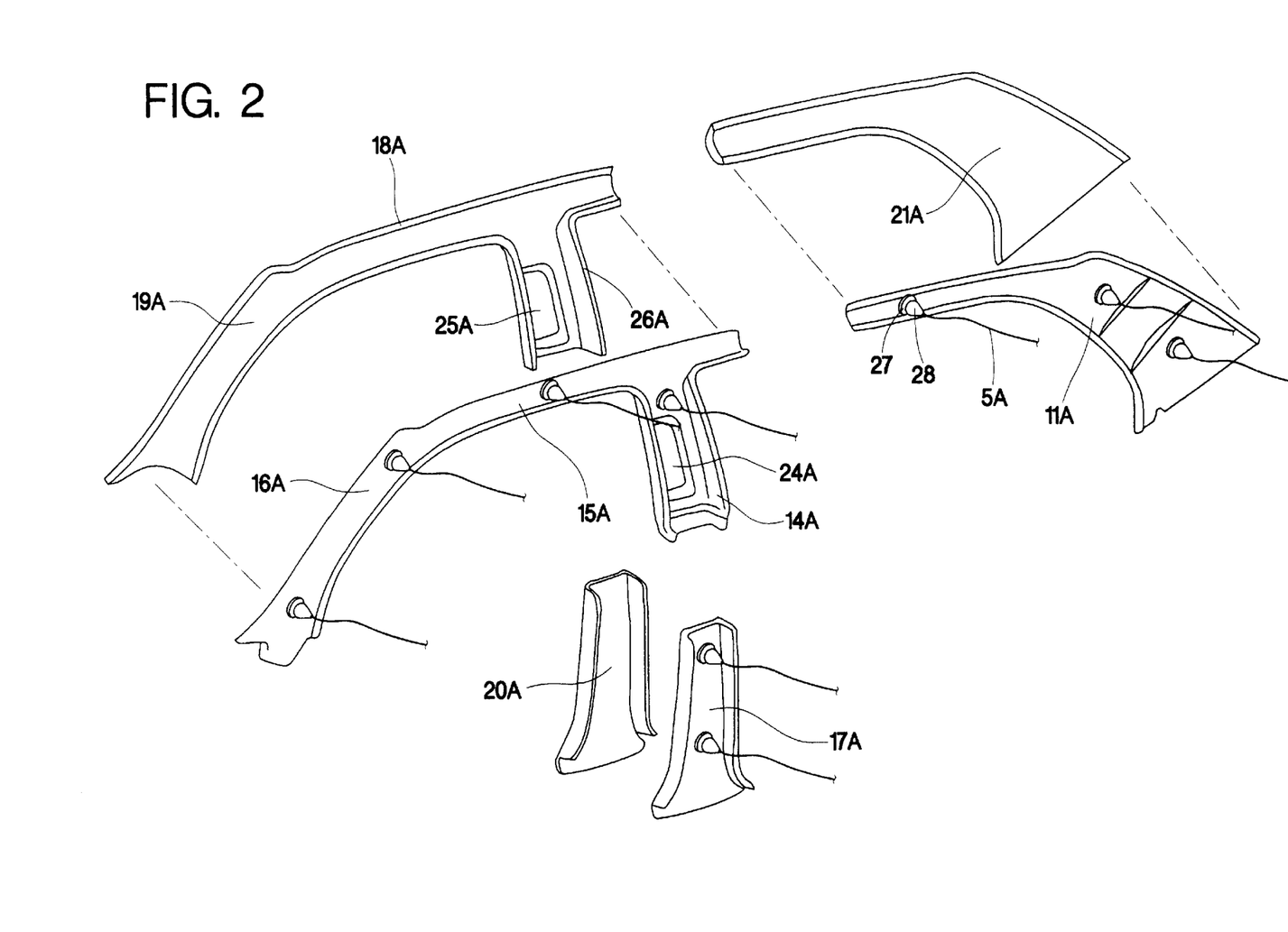
FIG. 2 is an isometric exploded view of left OEM trim panels and ballistic composite panels, the view showing blind fasteners and steel anchor cables.
Figure 5:
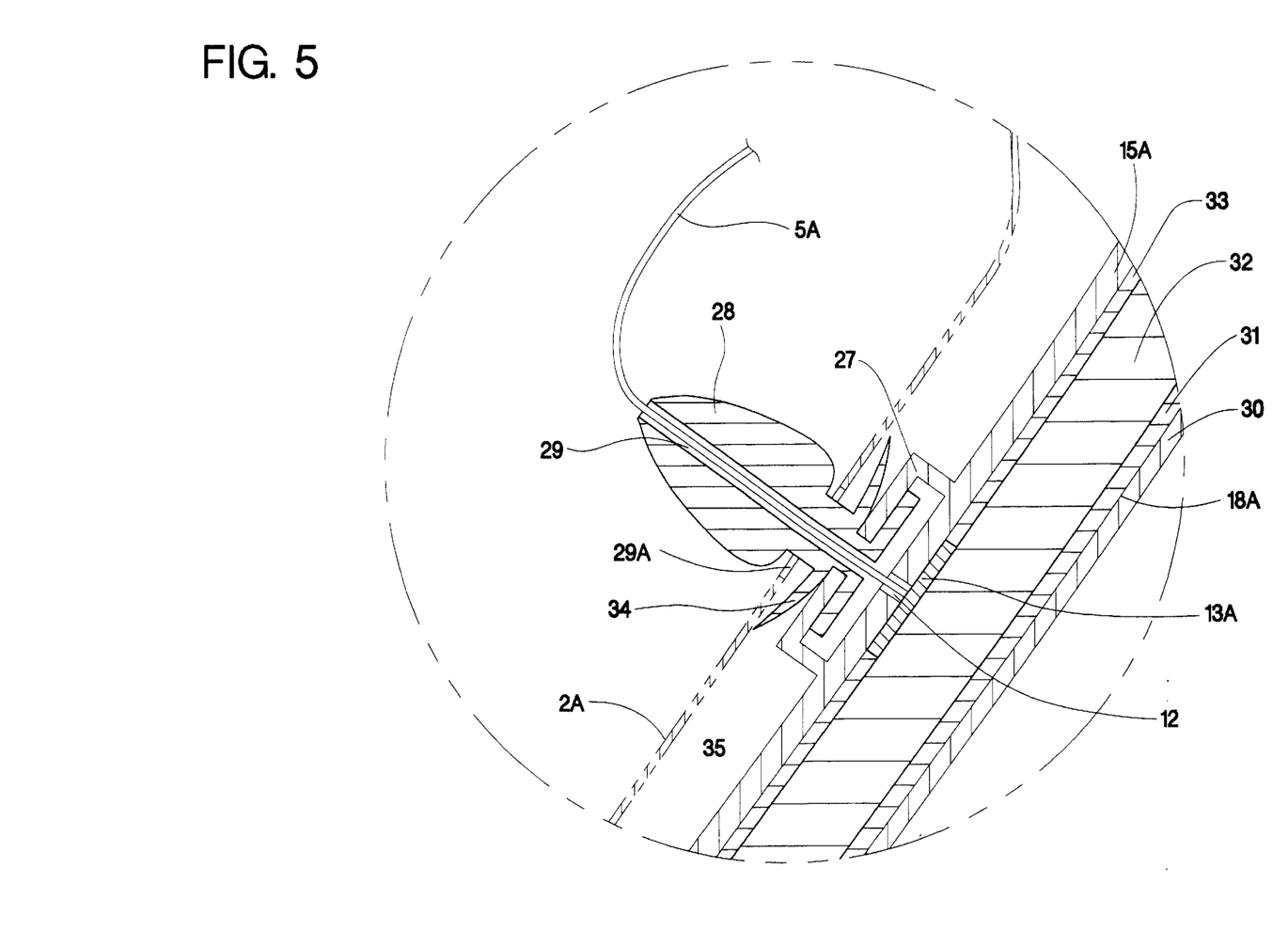
FIG. 5 is a magnified view of a portion of FIG. 4.

Referring to FIG. 2, the blind fasteners 28 are mounted upon the trim panels by, referring to FIG. 5, slotted fastener mounting posts 27 which extend outwardly. Referring to FIG. 1, the blind fasteners 28 held by such mounting posts also extend outwardly and are driven into fastener receiving apertures 29. Under normal vehicle operating conditions, the blind fasteners securely attached the OEM trim panels 11, 17, and 15 in their proper positions upon the body frame 1.

Referring further to FIG. 1, a unitary right "A" pillar and upper center body pillar ballistic composite 18 having a forward "A" pillar covering section 19 and having a rearward upper center body pillar covering section 26, is fabricated through a suitable molding process such as autoclave molding. The ballistic composite 18 is preferably molded so that the inwardly facing finish surface of the OEM unitary right trim panel 15 may nest within the outwardly facing surface of the ballistic composite 18. The OEM unitary right trim panel 15 and the unitary right ballistic composite 18 are nested together and fixedly bonded, preferably by means of an epoxy based adhesive. A right rear quarter ballistic composite 21 and a right lower center body pillar ballistic composite 20, are similarly molded and nestedly bonded respectively to the OEM right rear quarter panel 11 and the OEM right lower center body pillar panel 17. Referring to FIG. 5, the left unitary ballistic composite 18A (along with all other ballistic composite trim panels) preferably is composed of multiple layers of ballistic fiber fabric or strapping 32; such fabric or strapping being impregnated with an adhesive resin. The ballistic fiber layer 32 is preferably nested between inner and outer layers of fiberglass 31 and 33. The outer layer of fiberglass 31 may serve as an interior finish surface, or such layer may be covered by a layer of finishing upholstery 30.

Referring to FIG. 1, the right OEM unitary panel 15 and the right unitary ballistic composite 18 respectively have shoulder belt ports 24 and 25. Armoring of such shoulder belt ports 24 and 25 is typically accomplished through the placement of a separate ballistic composite shield (not shown) between the center body pillar 3 and the outwardly facing surface of the upper center body pillar section 14.

Figure 3:
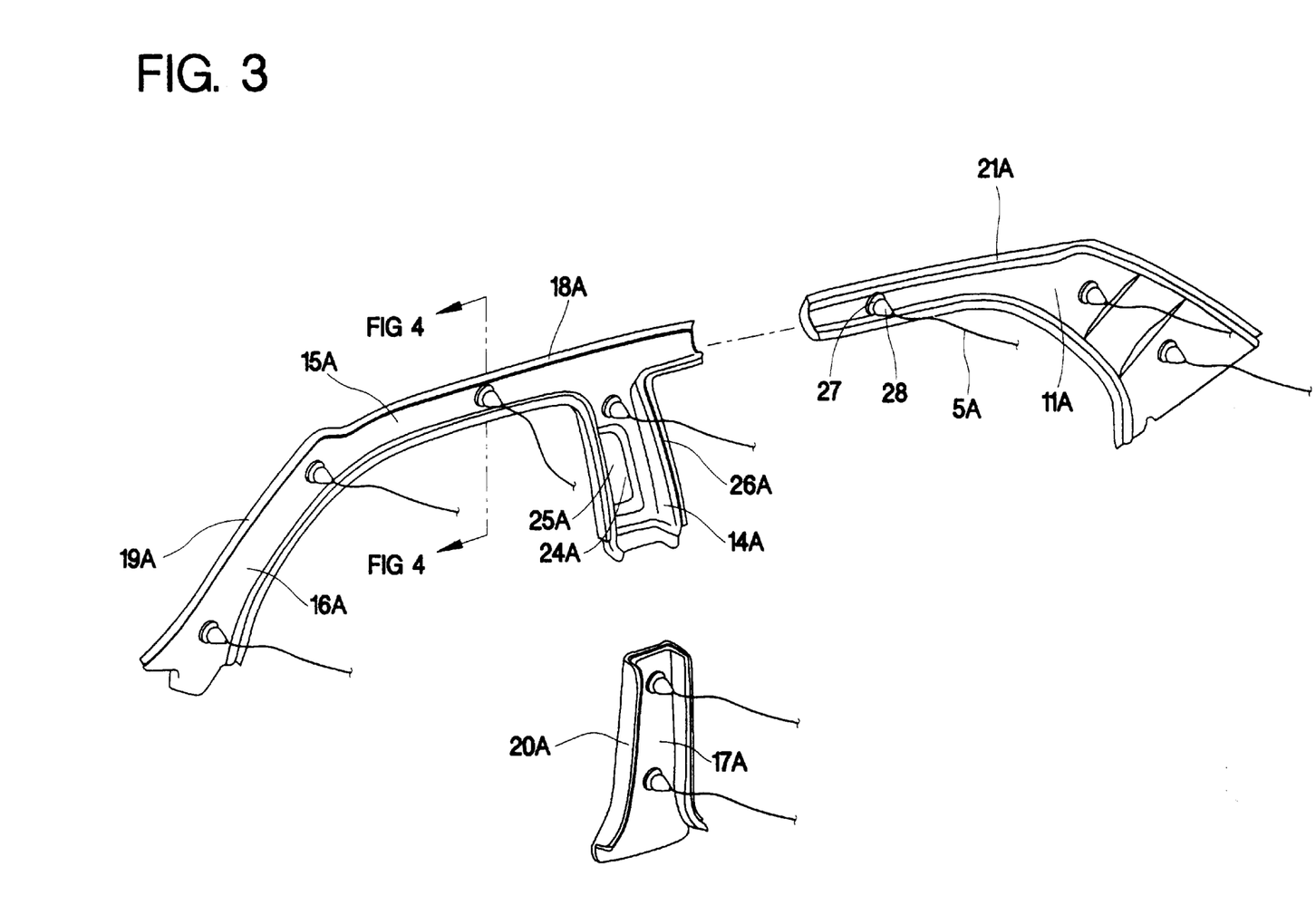
FIG. 3 is an isometric view of left OEM trim panels having attached ballistic composite panels; and showing blind fasteners and steel anchor cables.
Figure 4:
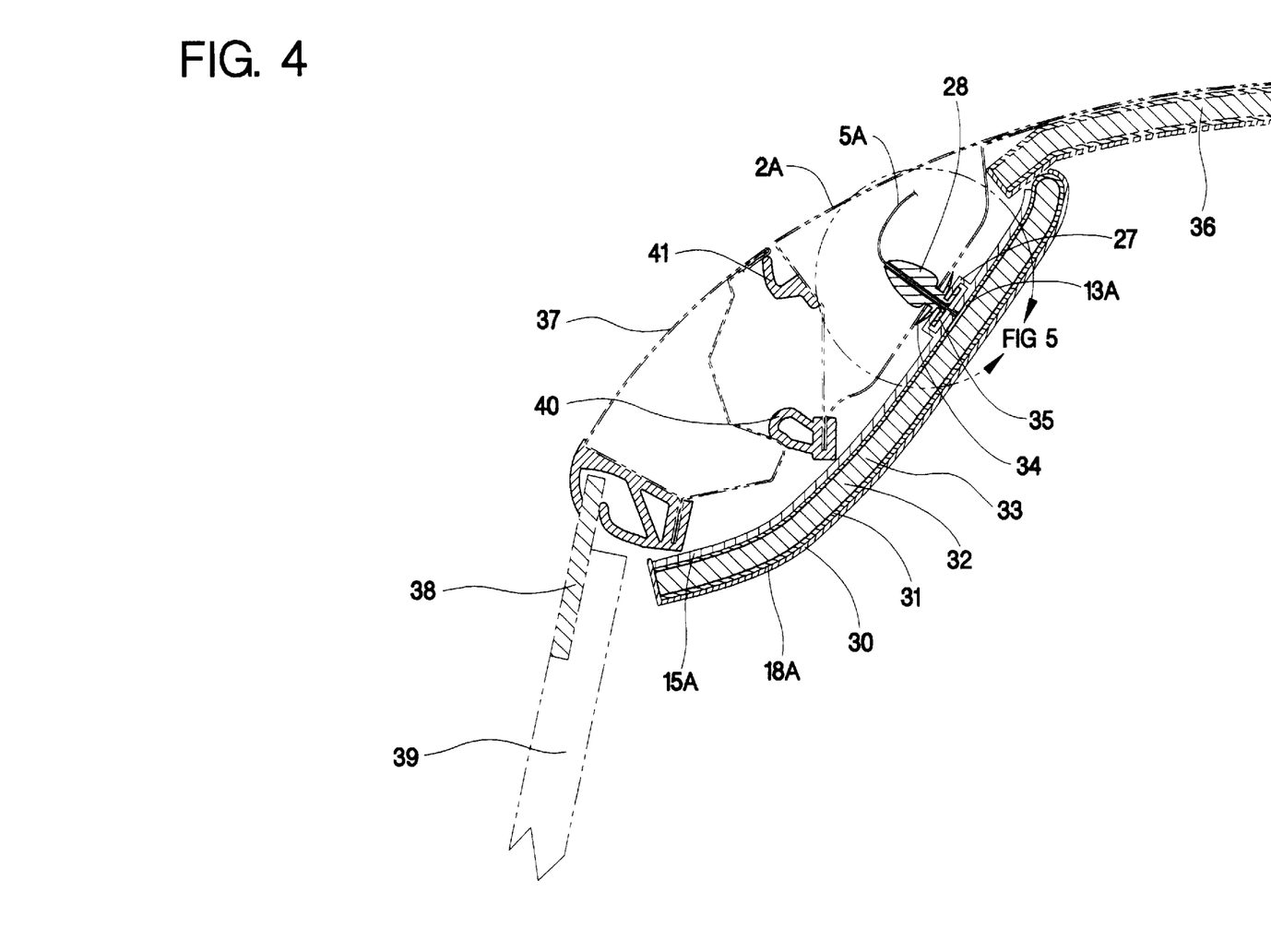
FIG. 4 is a sectional view of a right "A" pillar ballistic composite trim panel, the section passing through a blind fastener.

FIGS. 2 and 3 depict exploded and assembled views of left OEM trim panels and left ballistic composites. Drawing elements 11A, 15A, 16A, 17A, 18A, 19A, 20A, 21A, 24A, 25A, and 26A represent components installable upon the left side of the exemplary passenger sedan, such components mirroring drawing elements 11, 15, 16, 17, 18, 19, 20, 21, 24, 25, and 26 of drawing FIG. 1. FIG. 4 depicts a sectional view of the left OEM unitary trim panel 15A, such panel being nested within and adhesively attached to a left unitary ballistic composite 18A. The sectional plane of FIG. 4 passes axially through a fastener attachment post 27 and through a blind fastener 28.

Referring simultaneously to FIGS. 1 and 5, prior to adhesive bonding of the OEM trim panels to the ballistic composite panels, steel anchor cable receiving apertures 12 are drilling through the OEM trim panels at positions underlying their fastener attachment post 27. Steel anchor cables 5 are then extended through the apertures 12, each steel anchor cables 5 preferably having an enlarged head; the enlarged heads preferably comprising fixedly attached steel discs 13. Preferably, the steel anchor cables are composed of a multiplicity of interwound steel wires. The steel anchor cables 5 are extended through the apertures 12 until the steel discs 13 lie flush against the inwardly facing surfaces of the OEM trim panels. The inwardly facing surfaces of the OEM trim panels are then adhesively bonded to the outwardly facing surfaces of the ballistic composite panels, thereby securely and permanently affixing the steel discs 13 and the steel anchor cables in place. The blind fastener 28 preferably is a "push in" panel fastener having an axial channel 43 through which the steel anchor cable 5 may pass. Other suitable blind fasteners which may be utilized are: catch fasteners, magnetic fasteners, plastic tree clips, removable rivets, push mount rivets, ratchet panel rivets, panel clips, serrated plastic fasteners, pop rivets, hook and loop fasteners, push nuts, speed nuts, expanding pins, spring clips, hair pin clips, retaining rings, wedge anchors, split drive anchors, toggle anchors, jack nut anchors, tee nuts, blind rivets, snap fasteners, snap grommets, and spring fasteners. Where the blind fastener utilized lacks an axial channel, the steel anchor cable 5 preferably extends along the outer periphery surface of the blind fastener, and through the fastener receiving aperture 29.

Figure 6:
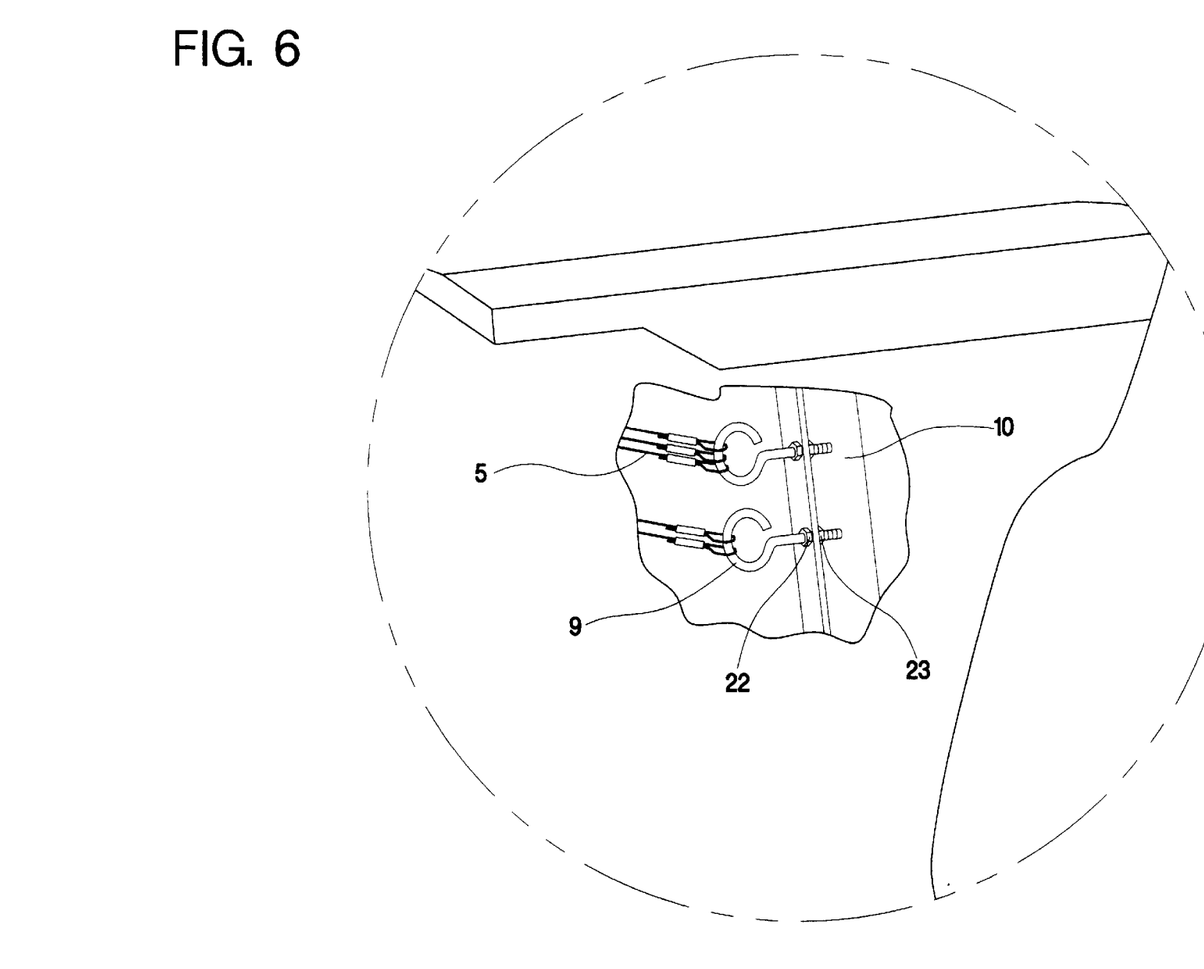
FIG. 6 is a magnified view of a portion of FIG. 1.
Figure 7:
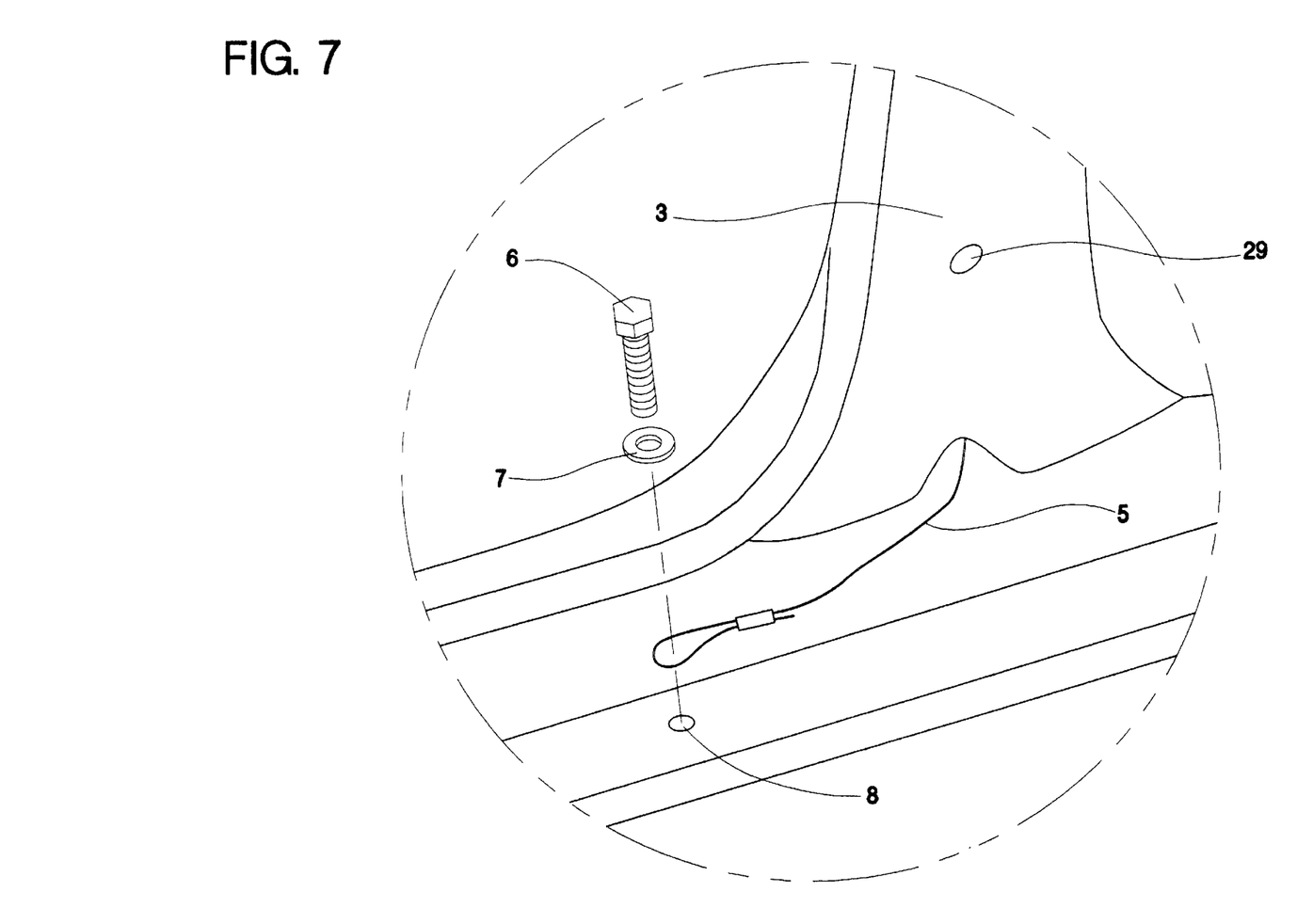
FIG. 7 is a magnified view of another portion of FIG. 1.

Referring to FIG. 1, the steel anchor cables 5, after extension through the fastener receiving apertures 29, further extend from those points along interior channels within the body frame 1. Referring to FIG. 6, the opposite ends of the steel anchor cables 5 are preferably anchored to a convenient structural frame member 10 by means of eye hooks or bolts 9. Through manipulation of threaded nuts 22 and 23, the steel cables 5 may be alternately released and tightened. Alternately, referring to FIG. 7, the steel cables 5 may be anchored by means of threaded bolts 6 extending into a threaded bolt receiving apertures 8, the heads of the bolts 6 pressing a washers 7 downward upon the looped ends of the steel cables 5. Referring to FIG. 5, utilization of the steel anchor cables 5 in conjunction with the blind fasteners 28 provides dual attaching means. The fastener supporting posts 27 in combination with the blind fastener heads 38 and the blind fastener collars 35 sufficiently serve as an attaching means under normal conditions. The combination of the nested steel disc 13 and the steel anchor cables 5 sufficiently serves as an attaching means under extreme circumstances where bullets strike the outwardly facing surfaces of the trim panels.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A vehicle armor anchoring assembly for a vehicle having a body frame, and having a passenger compartment, the passenger compartment having a plurality of roof supporting columns, each roof supporting column having an inwardly facing surface and an interior channel, the vehicle armor anchoring assembly comprising:

(a) a plurality of interior trim panels, each interior trim panel being fitted for covering the inwardly facing surface of one of the roof supporting columns of the passenger compartment of the vehicle, each interior trim panel having an outer surface and an inner surface, each interior trim panel comprising a bullet resistant material; and, (b) a plurality of cables interconnecting the interior trim panels and the roof supporting columns to which the interior trim panels are fitted, the cables being capable of holding the interior trim panels in place while bullets fired from firearms impinge upon their outer surfaces.

2. The vehicle armor anchoring assembly of claim 1, wherein each of the cables comprises a multiplicity of interwound steel wires, wherein a first end of each cable is fixedly attached to and extends outwardly from the outer surface of one of the interior trim panels, wherein a second end of each cable is fixedly attached to the body frame of the vehicle, and wherein each cable extends through the interior channel of one of the roof supporting columns.

3. The vehicle armor anchoring assembly of claim 2, wherein the interior trim panels and the roof supporting columns are further interconnected by a plurality of blind fasteners, each blind fastener having a head and a point, the head of each blind fastener being mounted upon and extending outwardly from the outer surface of one of the interior trim panels, each blind fastener being adapted for engagement with a fastener receiving aperture within the body frame of the vehicle.

4. The vehicle armor anchoring assembly of claim 3, wherein the blind fasteners are selected from the group of catch fasteners, magnetic fasteners, plastic tree clips, removable rivets, push mount rivets, ratchet panel rivets, push in panel fasteners, panel clips, serrated plastic fasteners, pop rivets, hook and loop fasteners, push and speed nut fasteners, expanding pin fasteners, spring clips, hair pin clips, retaining ring fasteners, wedge anchors, split drive anchors, toggle anchors, jack nut anchors, tee nuts, blind rivets or spring fasteners.

5. The vehicle armor anchoring assembly of claim 4, wherein the first end of each cable is positioned in close proximity with one of the blind fasteners, each first end of each cable having an enlarged head embedded within an interior trim panel.

6. The vehicle armor anchoring assembly of claim 5, wherein the fixed attachments of the second ends of the cables to the body frame of the vehicle comprise threadedly adjustable hooks or eye bolts, the threadedly adjustable hooks or eye bolts being mounted within hook receiving apertures within the body frame of the vehicle.

7. The vehicle armor anchoring assembly of claim 6, wherein the bullet resistant material of a plurality of the interior trim panels comprises a molded lamina of fibers selected from the group of polyethene fiber, polyaramid fiber, nylon fiber, graphite fiber, semi-crystalline polystyrene fiber, semi-crystalline polyethene fiber, aromatic polyamide fiber, or glass fiber.

\* \* \* \* \*